United States Patent [19]

Jackson

[11] Patent Number: 5,136,788
[45] Date of Patent: Aug. 11, 1992

[54] LOCATING DEVICE USED WITH ELECTRICAL OUTLET BOXES AND THE LIKE

[76] Inventor: Christopher A. Jackson, 11827 Amethyst Ct., Fountain Valley, Calif. 92708

[21] Appl. No.: 708,456

[22] Filed: May 31, 1991

Related U.S. Application Data

[63] Continuation-in-part of Ser. No. 515,590, Apr. 27, 1990, Pat. No. 5,040,304, which is a continuation-in-part of Ser. No. 305,380, Feb. 1, 1989, abandoned, which is a continuation-in-part of Ser. No. 17,931, Feb. 24, 1987, Pat. No. 4,802,284.

[51] Int. Cl.$^5$ .............................................. G01B 5/14
[52] U.S. Cl. .................................. 33/528; 33/DIG. 10
[58] Field of Search ........................... 33/527, DIG. 10

[56] References Cited

U.S. PATENT DOCUMENTS

| | | | |
|---|---|---|---|
| 4,059,905 | 11/1977 | Wieting | 33/528 |
| 4,202,388 | 5/1980 | Wieting | 33/528 X |
| 4,209,103 | 6/1980 | Glovier | 33/528 X |

Primary Examiner—Harry N. Haroian
Attorney, Agent, or Firm—John J. Connors

[57] ABSTRACT

Disclosed is a device for locating the open side of an electrical outlet box comprising a flat, cast aluminum locater plate having a pair of steel positioning pins extending outwardly from one side of the plate and a pair of steel template alignment pins extending outwardly from the other side of the plate. The template alignment pins are offset inwardly from the marginal edges of the locater plate to allow for clearance.

2 Claims, 1 Drawing Sheet

LOCATING DEVICE USED WITH ELECTRICAL OUTLET BOXES AND THE LIKE

RELATED PATENT APPLICATIONS

This patent application is a continuation-in-part application of U.S. patent application Ser. No. 07/515,590, filed Apr. 27, 1990 now U.S. Pat. No. 5,040,304 and entitled Locating Device Used With Electrical Outlets And The Like, which in turn is a continuation-in-part application of U.S. patent application Ser. No. 07/305,380, filed Feb. 1, 1989, and entitled Locating Device Used With Electrical Outlets And The Like, now abandoned, which is a continuation-in-part application of U.S. patent application Ser. No. 07/017,931, filed Feb. 24, 1987, also entitled Locating Device Used With Electrical Outlet Boxes And The Like, now U.S. Pat. No. 4,802,284. All of these prior U.S. patent applications are incorporated herein by reference and made part of this application.

BACKGROUND OF THE INVENTION

1. Field of the Invention

This invention relates to a device for locating the open side of an electrical outlet box covered by a panel.

2. Background Discussion

Typical construction methods call for installing panels of sheet rock and the like on wooden or metal studs placed approximately sixteen inches apart. Prior to installation of the panels, electrical wiring is installed with the electrical outlet boxes nailed in the desired position to the wooden studs. It is necessary to cut away sections of the panel to provide access to the open sides of the electrical outlet boxes. This is done prior to installation of the panels. A great deal of skill is necessary in order to quickly and accurately make the necessary measurements and cut away the section panel in the precise location so that the cut away section is in exact registration with the open side of the electrical outlet box upon installation of the panel. In many instances this is not done, leaving a large gap between the perimeter of the open side of the outlet box and the perimeter of the cut away section. Building codes, however, require that the gap between the perimeter of the cut away section and the perimeter of the open side of the outlet box be maintained at a minimum. Oftentimes, panels are installed which fail to meet building codes, but the building inspectors frequently overlook these discrepancies because there is not suitable means for doing the job quickly and accurately. In some instances where this gap is very excessive, a fire hazard is created and results in an unsafe structure.

Although devices have been suggested that purport to solve this problem, none have been accepted by the construction industry because they have been to expensive, complex, or impractical. Some of these devices are illustrated in the following U.S. Pat. Nos. 2,775,812; 3,823,754; 4,059,905; 4,087,913; 4,202,388; and 4,209,103.

SUMMARY OF THE INVENTION

The present invention provides an improvement in the devices disclosed in the predecessors patent applications incorporated herein by reference. The improvement resides in the manner of constructing the device.

The device is designed to locate the open side of an electrical outlet box during installation of a panel which covers said open side. The open side has a perimeter of a predetermined configuration and a center point, and the box has receptacle means along the perimeter which are adapted to receive fasteners. The device has a relatively thin, flat locater plate which has a configuration conforming to the configuration of said open side of the outlet box, marginal edges, a front side and rear side. The front and rear sides include a common center point. The locater plate covers the open side with the rear side abutting the perimeter of the box when the locater plate is placed in an overlying position over said open side. A pair of positioning pins extend outwardly from the rear side of the locater plate near the marginal edges and are adapted to be received in the receptacle means and positioned to bring the center point of the locater plate into coincidence with the center point of the open side of the outlet box when the positioning pins are inserted into the receptacles means. Template alignment pin means extend outwardly from the front side of the locater plate and are displaced inwardly from any marginal edges of the locater plate $\frac{3}{4}$ of an inch or more to provide clearance so that a person installing the panel avoids scrapping against the template alignment pin means when cutting away a section of the panel overlying said open side.

In accordance with the improvement provided by the present invention, the locater plate is a metal casting and the positioning pins and template alignment pin means have proximal ends embedded in the locater plate during casting to provide a rigid and strong structure that prevents the positioning pins and template alignment pin means from being jarred or otherwise dislodged from the locater plate during use. Preferably the locater plate is an aluminum casting and the positioning pins and template alignment pins are steel. Preferably the proximal ends of the positioning pins and template alignment pins are enlarged.

There are several features of this invention, no single one of which is solely responsible for its desirable attributes. Without limiting the scope of this invention as expressed by the claims which follow, its more prominent features will now be discussed in the section of the application entitled DESCRIPTION OF THE PREFERRED EMBODIMENT. After reading this section, and considering the disclosures in the predecessor applications incorporated herein by reference, one will understand how the features of this invention provide the ease of panel installation, accuracy of registration, improved cost savings, and rigged and durable construction.

BRIEF DESCRIPTION OF THE DRAWING

The drawing, where like numerals indicate like parts, depicts the preferred embodiment of this invention. This drawing is for illustrative purposes only.

DESCRIPTION OF PREFERRED EMBODIMENT

Figure 1:
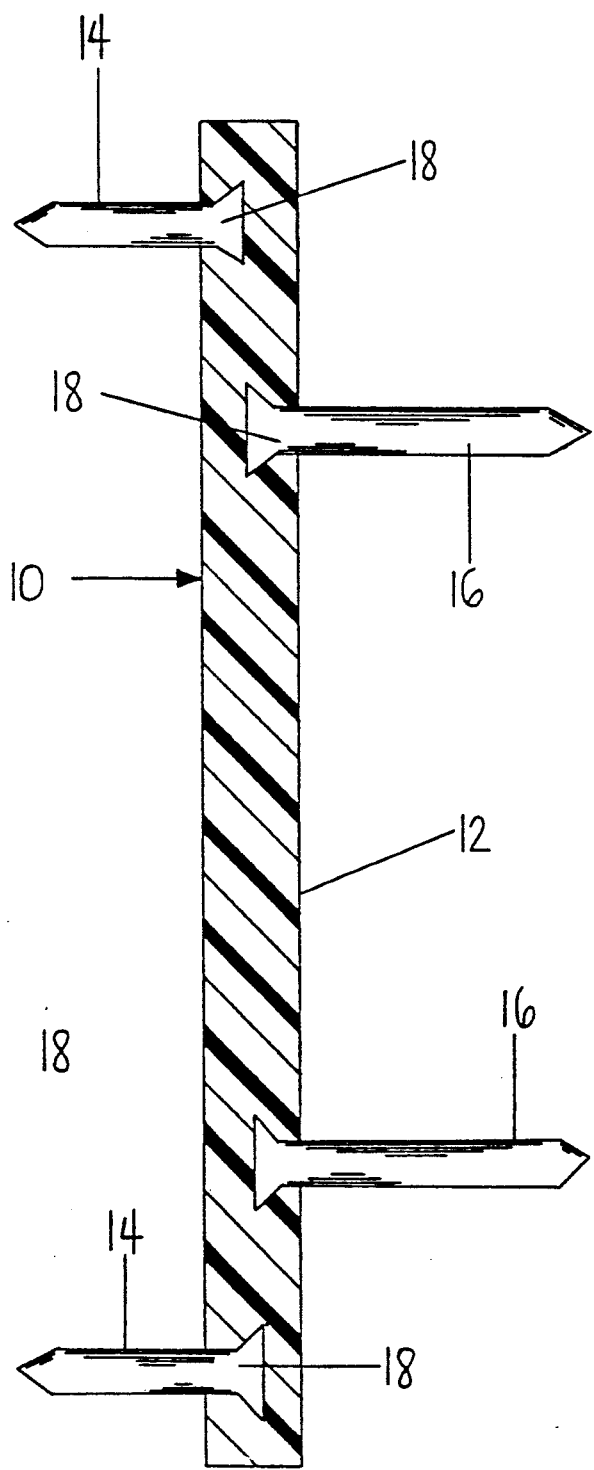
FIG. 1 is a cross-sectional view of the locater plate made from a aluminum casting with the positioning pins and template alignment pin means made of steel.

As best illustrated in FIG. 1, the device 10 of this invention includes a locater plate 12 having a generally rectangular configuration which has dimensions approximately equal to the dimensions of the open side of an electrical outlet box (not shown). A pair of positioning pins 14 extend outwardly from the rear side of the locater plate 12, and a pair of template alignment pins 16 extend outwardly from the front side of the locater plate. The positioning pins 14 are adapted to be received in opposed receptacles (not shown) in the open side of the outlet box.

The positioning pins 14 and template alignment pins 16 are offset relative to each other to provide clearance for the hands of the installer of the panel or any tool being used, particularly the brace for the bit of a rotary cutting tool. Specifically, the template alignment pins 16 are spaced inwardly ¾ inch or more from any any edge of the locater plate 12, typically from ¾ to 1½ inches. Thus, while gripping a hand cutter, the installer's knuckles will not scrape against the pins 16, nor will the bit strike these pins when using a powered rotary cutting tool. When the locater plate 12 is positioned to cover the open side 16 of the electrical outlet box, the perimeter of the plate will overlap the perimeter of the open side 16. This overlap distance may, for example, correspond to the maximum gap allowed by the building code of the locale where the electrical outlet box is being installed. Typically this will range between about 1/16 and about ⅛ of an inch.

With the locater plate 12 in position, the template alignment pins 16 extend outwardly and pierce a panel (not shown) as it is being installed. When the panel is placed in position flush against the front face of the locater plate 12, the template alignment pins 16 pierce through the panel and extend outwardly therefrom, enabling a template (not shown) to be placed in position in registration with the locater plate. The template alignment pins 16 are long enough to pierce the panel but do not extend more than about 1 inch from the panel when the panel is flush against the open side of the outlet box. The template alignment pins 16 cannot be excessively long, otherwise they will interfere with panel installation, tend to bend or snap off during panel installation, or rip the panel rather than piercing it.

With the locater plate 12 in position covering the open side of the outlet box and a panel sandwiched between the template and the locater plate 12, the user will simply insert a cutting tool 34 through the panel with the cutting edge of the tool abutting the marginal edges of the locater plate 12 and the marginal edges of the template, so that the user cuts away a section of the panel overlying the open side of the box with these edges guiding the tool. As the tool is moved around these edges, the desired panel section removal is completed simply by grasping the ends of the template alignment pins 28 extending through the template and pulling the assembly of the locater plate 12, cut away section of the panel and template away from the open side of the electrical box 18.

In accordance with the improvement provided by this invention, the locater plate 12 is made from cast aluminum. The positioning pins and template alignment pins all have at their proximal ends 18 enlarged heads which are embedded in the cast aluminum. The positioning pins 14 and template alignment pins 16 are made of steel. The locater plate 12 is made using conventional casting techniques, with the enlarged heads 18 of the pins 14 and 16 being inserted into a mold and the molten aluminum flowing into the mold and solidifying around the enlarged heads. This provides a light weight, rigid structure which is of rugged, durable construction.

SCOPE OF THE INVENTION

The above description presents the best mode contemplated for carrying out the present invention as depicted by the three embodiments disclosed. The combination of feature illustrated by these embodiments provide the simplicity, precision and cost savings of this invention. This invention, however, is susceptible to modifications and alternate constructions from the embodiments shown in the drawing and described above. Consequently, it is not the intention to limit it to the particular embodiments disclosed. On the contrary, the intention is to cover all modifications and alternate constructions falling within the scope of this invention as generally expressed by the following claims.

I claim:

1. A device for locating the open side of an electrical outlet box or the like during installation of a panel which covers said open side, said open side having a perimeter of a predetermined configuration and a center point, and said box having receptacle means along the perimeter which are adapted to receive fasteners, said device including a relatively thin, flat locater plate which has a configuration conforming to the configuration of said open side of the outlet box, marginal edges, a front side and rear side, said front and rear sides including a common center point, said locater plate covering said open side with said rear side abutting the perimeter of the box when the locater plate is placed in an overlying position over said open side, a pair of positioning pins extending outwardly from the rear side of the locater plate near the marginal edges and being adapted to be received in the receptacle means and positioned to bring the center point of the locater plate into coincidence with the center point of said open side of the outlet box when the positioning pins are inserted into the receptacles means, and template alignment pins extending outwardly from the front side of the locater plate and being displaced inwardly from any marginal edges of the locater plate ¾ of an inch or more to provide clearance so that a person installing the panel avoids scrapping against the template alignment pin means when cutting away a section of the panel overlying said open side, said locater plate being an aluminum casting and said positioning pins and template alignment pins being made of steel and having proximal ends embedded in the locator plate during casting to provide a rigid and strong structure that prevents said positioning pins and template alignment pins from being jarred or otherwise dislodged from the locater plate during use.

2. The device of claim 1 wherein the proximal ends of the positioning pins and template alignment pins are enlarged.

* * * * *